Figure 1:
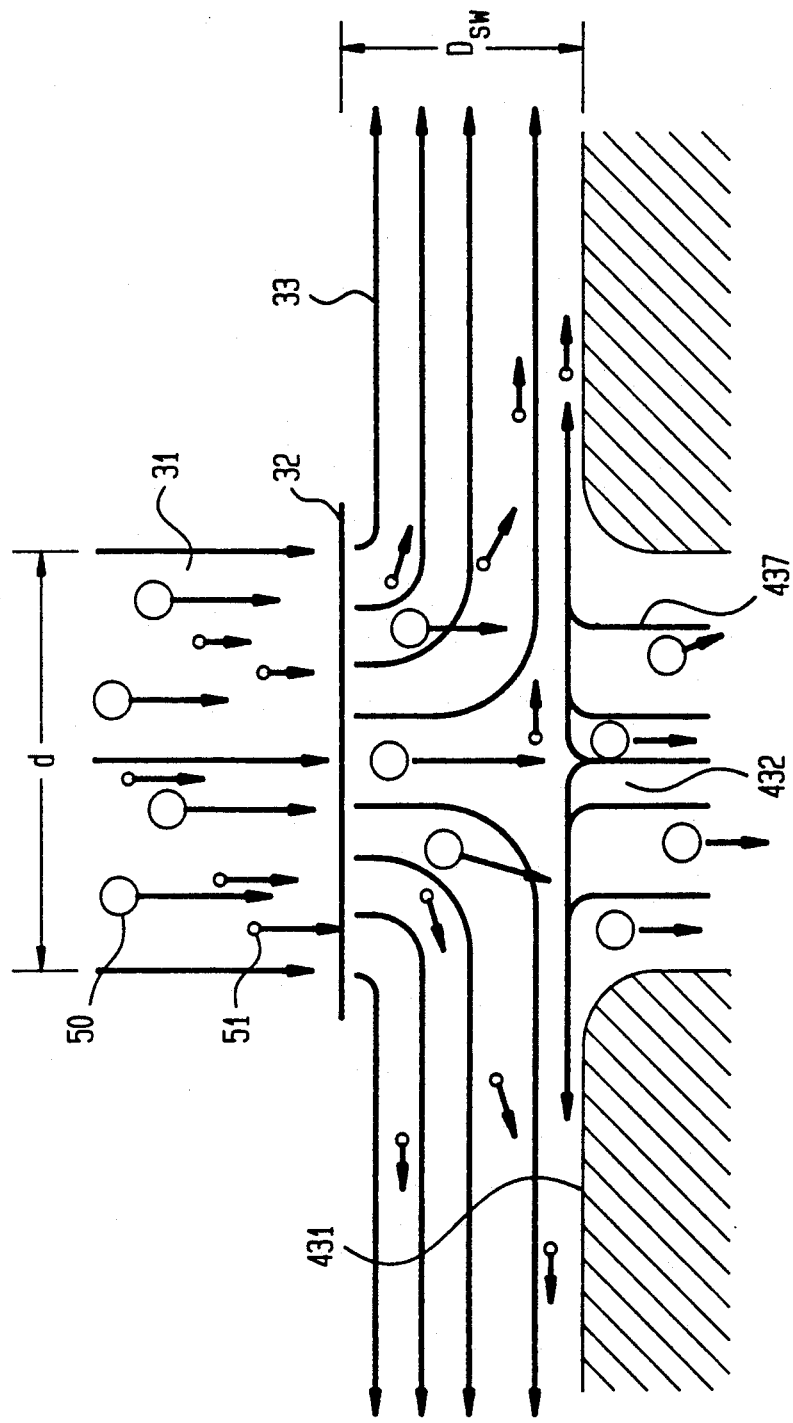
Figure 2:
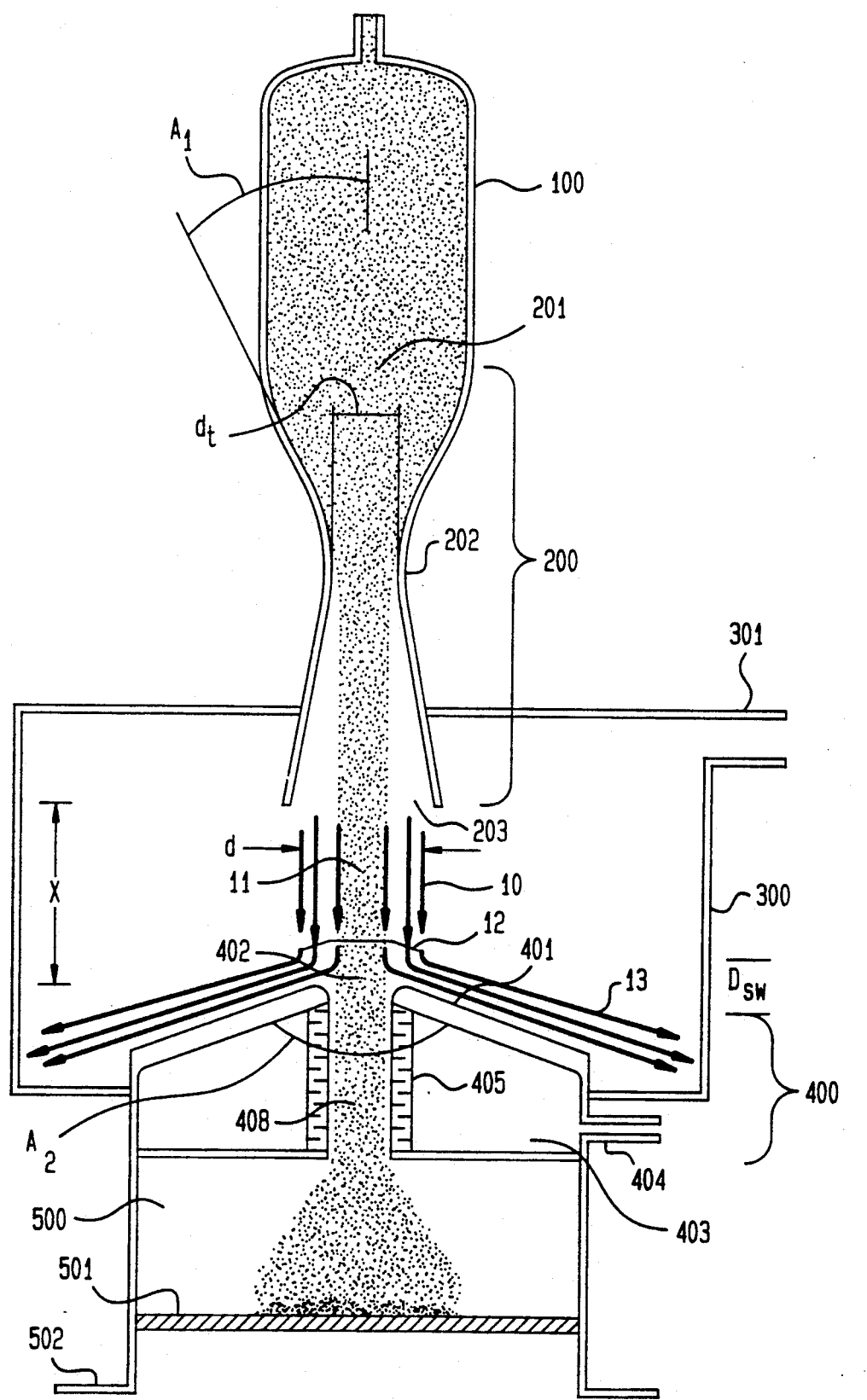

United States Patent [19]

Felder

[11] Patent Number: 5,183,481
[45] Date of Patent: Feb. 2, 1993

[54] SUPERSONIC VIRTUAL IMPACTOR

[75] Inventor: William Felder, Lawrenceville, N.J.

[73] Assignee: Aerochem Research Laboratories, Inc., Monmouth Junction, N.J.

[21] Appl. No.: 712,360

[22] Filed: Jun. 7, 1991

[51] Int. Cl.$^5$ ............................................. B01D 45/00
[52] U.S. Cl. .......................................... 55/15; 55/17; 55/392
[58] Field of Search .................... 209/139.1, 143, 145; 55/15, 17, 92; 239/589, 590; 73/28.05

[56] References Cited

U.S. PATENT DOCUMENTS

| | | | |
|---|---|---|---|
| 2,793,282 | 5/1957 | Steigerwald | 219/69 |
| 3,077,307 | 2/1963 | Moore et al. | 239/338 |
| 3,430,289 | 3/1969 | Aikawa et al. | 18/2.5 |
| 3,602,595 | 8/1971 | Dahlquist et al. | 356/36 |
| 3,659,944 | 5/1972 | Bojic | 356/86 |
| 4,147,534 | 4/1979 | Hori | 55/17 |
| 4,301,002 | 11/1981 | Loo | 209/143 |
| 4,358,302 | 11/1982 | Daheneke | 55/17 |
| 4,452,068 | 6/1984 | Loo | 73/28.05 |
| 4,670,135 | 6/1987 | Marple et al. | 509/143 |
| 4,767,524 | 8/1988 | Yeh et al. | 209/143 |
| 4,806,150 | 2/1989 | Alvarez et al. | 75/0.5 C |

FOREIGN PATENT DOCUMENTS

| | | | |
|---|---|---|---|
| 693162 | 10/1979 | U.S.S.R. | |
| 206346 | 11/1923 | United Kingdom | 209/139.1 |
| 517774 | 2/1940 | United Kingdom | 55/17 |

Primary Examiner—Bernard Nozick
Attorney, Agent, or Firm—Mathews, Woodbridge & Collins

[57] ABSTRACT

A supersonic gas flow is employed with a virtual impactor to separate fine particles completely from the gas. The carrying gas and fine particles are accelerated to supersonic speeds and then impacted against a virtual impactor. When the supersonic stream strikes the virtual impactor, a shock wave forms in the gas stream near the impactor surface. The carrying gas turns sharply away while the particles in the gas stream, carried by their inertia, continue in their original direction and pass into the virtual impactor. On the downstream side of the virtual impactor surface, a non-contaminating inert gas maintains a pressure equal to or greater than the pressure of the carrying gas between the virtual impactor surface and the shock wave. By using a supersonic flow to carry the particles, the carrying gas can be effectively completely separated from the particles and the minimum size of particles that can be separated from the carrying gas can be reduced from those achievable by conventional prior art subsonic flow virtual impactors.

15 Claims, 3 Drawing Sheets

SUPERSONIC VIRTUAL IMPACTOR

This invention was made with Government support under Contract N0014-90-C-0177 awarded by the Department of Navy. The Government has certain rights in the invention.

BACKGROUND OF THE INVENTION

1. Field of the Invention

This invention relates to a method and an apparatus for separating fine particles from a carrying gas by accelerating the carrying gas to a supersonic speed and impacting it against a virtual impactor so as to form a shock wave at the surface of said virtual impactor and collecting the fine particles that pass through the surface of the virtual impactor in the interior chamber of the virtual

2. Description of the Prior Art

The separation and collection of fine particles from gases is of intense interest in material sciences where fine particles may have unique and valuable properties. Often such particles are produced along with by-product vapors in high temperature environments. It is frequently of importance to preserve the purity of the particles by separating them from the byproduct vapors which may condense on them if the particles are simply filtered.

The separation and collection of fine particles from gases is also important in preventing such particles from entering the atmosphere as an unintended consequence of manufacturing or power generation processes, as in the manufacture of cements and the fly ash produced from coal-fired electrical generators. Large investments are made in filtration systems and/or high voltage electrical devices to separate and collect the fine particles that can cause pollution.

The separation and collection of fine particles from gases is also important in research on atmospheric aerosols and particulates and in preparing powders comprising particles of uniform size for such applications as advanced materials processing.

Prior art devices known as virtual impactors are often used to classify fine particles suspended in carrying gas according to their sizes. In these devices, a subsonic gas stream containing particles is caused to impinge upon a surface containing an aperture. The flow of the impinging gas/particle stream into the aperture is controlled in such a way that only a small fraction of the impinging flow passes into the aperture. The majority of the gas in the stream and the small particles which follow the gas flow are forced to turn away from the aperture. Larger particles, with greater momentum, cannot negotiate the turn and follow the smaller (minority) flow into the aperture. The minority flow and the larger particles are carried through the aperture to a collection device for the particles, such as a filter. The majority flow and the smaller particles are passed into a separate collection device. Very accurate and balanced control of the majority and minority flows is used to determine the size cutoff between particles passing through the aperture with the minority flow and those which follow the majority flow. Successive stages of virtual impactors may be used to further classify the smaller particles in the majority flow. The smaller the particles, the greater their tendency to follow the gas flow, and thus the more difficult they are to classify, requiring ever more accurate flow control and geometric tolerances.

Another kind of prior art virtual impactor, called a counterflow virtual impactor, is used to attain closer control of the size cutoff between particles collected from the minority flow and those retained in the majority flow. In the counterflow virtual impactor, a particle laden gas flow is caused to impinge upon a surface containing an aperture as described. In this case, the apertured surface is formed by a solid plate joining together two concentric tubes. The outer tube has a solid wall and the inner tube has a porous wall for a short distance near its end joining the solid plate. The inner tube forms the aperture and the solid plate joining it to the outer tube forms the solid surface of the virtual impactor. Gas is supplied to the annular space between the tubes and passes through the porous part of the inner tube into the space behind the aperture. A suction is applied to the end of the inner tube away from the aperture. Part of the gas added through the porous wall is drawn into the suction and part flows toward the aperture. Because of this difference in flow direction, there is a plane in the porous tube at which the added gas flow has zero velocity along the axis of the porous tube. This plane lies within the porous tube behind the aperture and solid plate which form the surface of the virtual impactor. Particles impacting the apertured surface either penetrate the aperture or are turned aside depending on their size and velocity. The counterflow of gas from the porous tube provides an additional selection method by forcing those particles which are collected to travel some distance within the porous tube in order to pass the plane of zero gas velocity. Those which do pass this plane are entrained in the gas flow drawn by the suction and may be collected by a device such as a filter. Those particles which do not reach the zero velocity place are expelled to rejoin the majority flow turned aside at the virtual impactor surface. The gas flow through the porous tube may be varied in order to move the position of the plane of zero velocity, thereby selecting the penetration distance of the particles which are collected. The penetration distance depends upon the particle size, and thus selecting the penetration distance is effective in selecting the size cutoff of the particles collected—for a given penetration distance, particles larger than a certain size will be collected while smaller particles will be rejected.

There is some limited discussion in the prior art patent literature with regard to supersonic flows in the context of virtual impactors, however, the purpose and function of those flows is entirely different from the subject matter of the present invention. For example, U.S. Pat. No. 4,806,150 entitled DEVICE AND TECHNIQUE FOR IN-PROCESS SAMPLING AND ANALYSIS OF MOLTEN METALS AND OTHER LIQUIDS PRESENTING HARSH SAMPLING CONDITIONS by Joseph L. Alvarez and Lloyd D. Watson discloses the use of supersonic flows in a device that includes a virtual impactor. The purpose of the supersonic flow is to break up injected liquid and to provide more effective cooling of the particles in the flow than is found in subsonic atomizers. There is no teaching or suggestion of impacting the supersonic flow against a virtual impactor so as to provide for particle separation or sizing.

U.S. Pat. No. 5,021,221 discusses a solid plate impact separator utilizing the impingement of a particle laden supersonic stream onto a solid plate for the separation of fine liquid particles from gases That device is incapable of separating solid particulates from gases because it requires the material being collected to "stick" when it strikes the surface, so that it, for example, forms a thin liquid film on the surface of the solid impactor plate to aid in sticking of newly arrived liquid particles. In addition, the disclosure in the cited patent does not teach or suggest collection or separation of solid particles. The present invention will separate either solid or liquid particles from gases, but the separation and collection of solid particles is the preferred use.

Similarly, Russian Patent SU 693 162 discusses an impactor that uses supersonic flows to collect small particles on a side wall, but otherwise appears to be irrelevant to the subject matter of the present invention.

The following patent references appear to be of lesser relevance: U.S. Pat. Nos. 2,793,282; 3,077,307; 3,430,289; 3,602,595; 3,659,944; 4,301,002; 4,670,135 and 4,767,524.

A useful discussion of the physical principles relevant to the present invention is set forth in the following reference texts: THE DYNAMICS AND THERMODYNAMICS OF COMPRESSIBLE FLUID FLOW, VOL. I AND II, by A. H. Shapiro (Ronald Press, N.Y. 1954) and HYPERSONIC FLOW THEORY by W. D. Hayes and R. F. Probstein (Academic Press, N.Y. 1966).

It was in the context of the foregoing prior art that the present invention arose.

SUMMARY OF THE INVENTION

Figure 3:
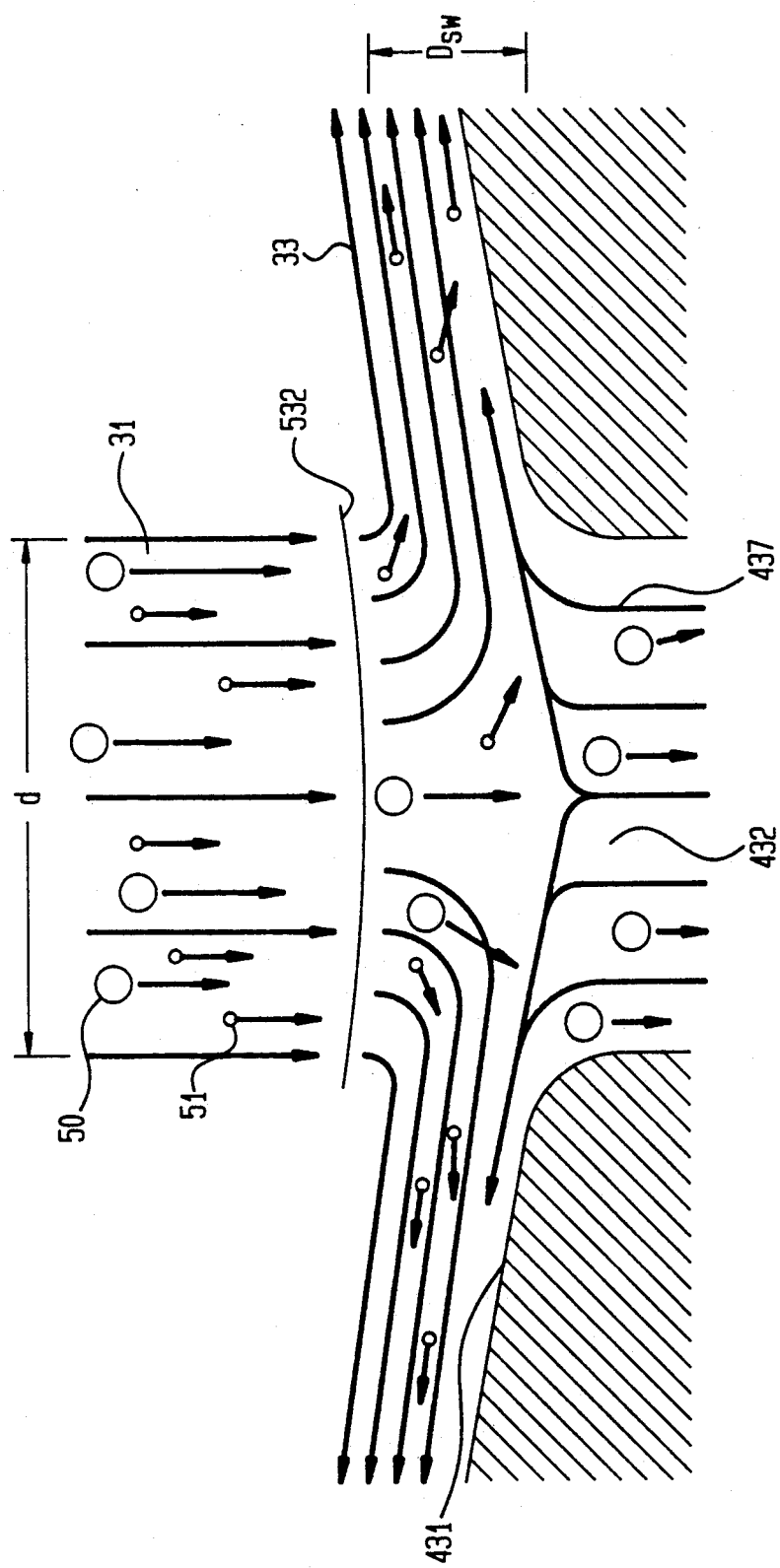

Briefly described, the invention comprises a supersonic virtual impactor for separating fine particles from a carrying gas stream. The device separates fine particles from carrying gas by forming a directed supersonic stream of the carrying gas containing the particles and impacting the stream against a wall or shaped body which includes an aperture. When the stream strikes the wall or body, a shock wave forms in the gas stream near the surface which delineates the large, instantaneous decrease in gas velocity from supersonic upstream of the shock wave to subsonic downstream of the shock wave. Downstream of the shock wave, the carrying gas turns aside; the particles, carried by their inertia, continue in their original direction, passing through the aperture in the wall or body. On the far side of the aperture, a non-contaminating inert gas maintains a pressure equal to or greater than the pressure of the carrying gas between the wall and the shock wave. Particles thus pass from the carrying gas into the inert gas behind the wall, while the carrying gas turns aside. The particles penetrate for a certain distance into the inert gas until drag forces slow their velocity to the gravitational settling velocity. At this distance, the particles are transported by flowing the inert gas to a collection means, e.g., a filter.

The major object of the present invention is to provide an improved means for separating and collecting fine particles from carrying gases. The carrying gases may be at high temperatures and/or may be condensible. The minimum size of particle that can be separated from the carrying gas is smaller than that achievable with conventional prior art subsonic flow virtual impactors. In addition, in the prior art, it is common for the carrying gas, if it is a condensible vapor, to contaminate the particles should it be deposited with them on a filter inside of the virtual impactor. According to the present invention, however, virtually none of the carrying gas accompanies the particles separated from the supersonic gas flow stream.

These and other features of the present invention will be understood by referring to the following drawings.

BRIEF DESCRIPTION OF THE DRAWINGS

FIG. 1 is a detailed cross-sectional view of the region close to the surface of the supersonic virtual impactor illustrating the separation of particles from the carrying gas; and, FIG. 2 is a cross-sectional view of the method and apparatus of the present invention for separating and collecting particles from a carrying gas.

FIG. 3 illustrates the impactor assembly with concave plate 532.

DETAILED DESCRIPTION OF THE INVENTION

During the course of this description, like numbers will be used to identify like elements according to the Figures that illustrate the invention.

The novel method of the present invention is to form a supersonic stream of the particle laden carrying gas and to impinge that stream upon a virtual impactor. Doing this improves the performance of the virtual impactor as a particle size classifier, and it has the consequence of making it a device which separates the particles essentially completely from the carrying gas. It has the further consequence that for particles in the 0.1–10.0 μm size range, essentially all of the particles impinging on the virtual impactor may be collected free of the carrying gas in a single pass. No subsonic virtual impactor or subsonic counterflow virtual impactor can achieve this essentially complete separation for such a large range of particle sizes in a single step. Thus, the supersonic virtual impactor is useful as a method and apparatus to separate particles from carrying gas. Additionally, the supersonic virtual impactor is useful as a classifier for small particles since the size cutoff of particles may be as small as 0.1 μm. Thus, such small particles may be separated from even smaller particles which are carried away, in the language of the prior art, with the majority flow. This size cutoff is smaller than can be achieved with subsonic prior art virtual impactors.

According to the preferred embodiment of the present invention, by using a supersonic flow to carry the particles, the particles may be essentially completely separated from the carrying gas and the minimum size of particle that can be separated from the carrying gas can be reduced from that achievable with conventional prior art subsonic flow virtual impactors. There are two reasons for this: 1) the momentum of the particles is larger (i.e. particles of the same size have a higher velocity in the supersonic flow than they would in a subsonic flow) and 2) the travel times and distances over which aerodynamic drag forces which could cause the particle trajectory to miss the collecting aperture operate are smaller in the supersonic flow.

This latter point is illustrated in FIG. 1 which schematically shows a detailed cross section of the region very close to the surface of the supersonic virtual impactor. In FIG. 1, a cylindrical particle laden supersonic gas stream 31 of diameter, d, is shown impinging of the surface of a virtual impactor, comprising a solid plate 431 and an aperture 432 from which is issuing a counterflow of inert gas 437. The impingement causes a shock wave 32 to be formed in the supersonic stream 31 at a distance $D_{sw}$ from the surface of the virtual impactor. The distance $D_{sw}$ is approximately equal to d/4. For illustrative purposes, two sizes of particles are shown in the supersonic stream 31, the larger 50 being envisioned to be about 3 μm in diameter and the smaller 51 being less than 0.1 μm in diameter. In the region upstream of the shock Wave 32 (above the shock wave 32 in FIG. 1) aerodynamic drag forces cause the particles to move in a direction perpendicular to the virtual impactor surface. Downstream of the shock wave 32, the carrying gas 33 is forced to turn sharply away from the obstacle presented to it by the virtual impactor surface, and aerodynamic drag forces act to pull the particles with the carrying gas 33 parallel to the impactor surface so as to cause them to veer away from the aperture 432. The large particles 50 have sufficient mass and velocity to overcome these drag forces and to penetrate into the aperture 432 separated from the carrying gas 33 for subsequent collection. The small particles 51 are dragged away from the aperture with the flow of carrying gas 33.

As FIG. illustrates, drag forces that negatively influence particle trajectories (i.e. cause them to miss the collecting aperture) operate only in the region downstream of the shock in the supersonic flow case. Upstream of the shock wave, drag forces direct the particles toward the impactor aperture. The shock wave is the boundary of a sharp discontinuity in the carrying gas flow speed and direction occurring only in supersonic flow. By comparison, in a conventional prior art subsonic flow virtual impactor, gas flow follows smoothly curving streamlines from the location at which the subsonic stream is formed all the way to the impactor surface. The curving streamlines result from the fact that the presence of the impactor surface in the flow is communicated upstream against the flow at the velocity of sound in the carrying gas. Thus drag forces which act to cause the particles to miss the aperture operate over the full flow distance of the subsonic stream whereas the analogous drag forces act only over the small distance between the shock wave 32 and the impactor surface 431 in the supersonic flow case.

FIG. 2 is a cross sectional diagram illustrating the present invention comprising an upstream section 100 into which particle laden ga is admitted through a tube 101. The upstream section is bounded by a nozzle section 200 through which the particle laden gas flows into the downstream section 300. The supersonic stream 10 formed by the nozzle 200 impinges on a virtual impactor assembly 400 located within the downstream section 300. Particles are separated from the carrying gas and enter a filter chamber 500 where they are collected on a filter 501. The separated carrying gas exits the downstream section through a tube 301 (or, if it is condensible, it may be condensed upon the walls of the downstream section 300).

The formation of a supersonic stream 10 of the particle laden carrying gas is effected by passing the gas through a nozzle 200 which may be shaped according to the known arts for such structures, e.g., a converging cylindrical tube, a converging-diverging cylindrical tube (known as a de Laval nozzle) or the equivalent structure in which the openings are rectangular slits rather than circular. The convergent section of the nozzle 201 concentrates the particles toward the center of the flow through the nozzle. The carrying gas pressure in the upstream section 100 where it enters the nozzle 200 is kept at least two times larger than the gas pressure at the exit of the nozzle 204 where it enters the downstream section 300 either by compressing the upstream gas or applying a vacuum to the downstream gas. The ratio of pressures between the upstream section 100 and downstream section 300 determines the velocity of the resulting stream, which will be supersonic whenever the pressure ratio exceeds about 2. When the carrying gas and particles exit the portion of the nozzle which has the smallest cross-section (the "throat" 202), they begin to experience the reduced pressure of the downstream section and the carrying gas expands and accelerates. The inertia of the particles tends to keep them in the core 11 of the expanding gas stream 10 thus resulting in a focusing effect in which particles are focused into a core 11 due to the fact that outward radial acceleration of the particles is smaller than that of the gases. The ability of the particle trajectories to follow or separate from gas jet streamlines determines the focusing effect, and consequently larger particle sizes will be focused more than smaller particles.

The downstream section of the nozzle 203 may be a diverging section as in a de Laval nozzle or the gas may be allowed to expand freely. A de Laval nozzle may be used which is designed so that the divergence of the nozzle exactly matches the gas expansion from the pressure at the throat 202 to the pressure at the downstream section 300. When this is done, the supersonic stream 10 formed by such a nozzle maintains its shape and does not expand further beyond the cross-sectional area which it has at the nozzle exit 204. The supersonic stream thus formed will contain a core 11 of particle-laden carrying gas surrounded by a flow of the remaining carrying gas. The total cross-sectional area of the stream 10 will be approximately that of the exit of the shaped nozzle 204; the cross-sectional area of the particle-laden core 11 will be approximately that of the throat 202. The cross sectional shapes of the stream 10 and core 11 will be those of the nozzle exit 204 and throat 202, respectively.

At some distance, denoted x, from the nozzle exit 204, the virtual impactor assembly 400 is placed such that the supersonic stream impinges upon it. The distance x may be chosen as suits convenience of construction for an ideal expansion using a de Laval nozzle and this is the preferred mode of operation. For operating conditions deviating from ideal, x is chosen preferably to be less than the distance at which a shock wave would form if the downstream section 203 of the nozzle were eliminated, i.e., in the case of free expansion. For such a situation, the distance x is chosen according to the formula $x<0.67\cdot d_t\cdot(P_0/P_d)^{1/2}$, where $d_t$ is the diameter of the nozzle throat 202, $P_0$ is the pressure in the upstream section 100, and $P_d$ is the pressure in the downstream section 300. As an example, for a pressure ratio, $P_0P_d=10$ across a nozzle with $d_t=1$ cm, x would be chosen preferably less than about 2.1 cm for operating conditions deviating from ideal.

The size of the virtual impactor aperture 402 is preferably that of the core 11 of the supersonic stream 10 at the selected distance. In this context, "size" means cross sectional area and shape. For the ideal de Laval nozzle, this size is approximately equal to that of the nozzle throat 202. The aperture may be chosen larger, up to a size approximately equal to that of the supersonic stream at the selected distance. The cross-sectional area of the supersonic stream may be estimated as a function of distance from the nozzle by methods described in the Reference texts.

The front face 401, which contains the aperture 402, of the virtual impactor assembly 400 may be a flat plate or may be shaped in a manner known in the art (described in the Reference text by Hayes and Probstein) to achieve a stable shape and standoff distance, $D_{sw}$, for the shock wave 12. FIG. 3 illustrates the virtual impactor assembly with concave plate 532. The objective in shaping the front face 401 is to minimize the standoff distance, $D_{sw}$, which as indicated, is the distance over which drag forces act to cause particles to miss the aperture. Thus a convex curvature or conical shape of the front face permits a smaller $D_{dw}$ than does a flat face, further reducing the distance over which drag forces can negatively affect particle trajectories.

Inert gas, for example argon or nitrogen or another gas which is unreactive with the supersonic stream gas or the particles, is introduced via conduit 404 into the impactor plenum 403 which is in fluid communication with the impactor chamber 408 to maintain the pressure in the impactor chamber slightly greater than the pressure behind the shock wave 12, the recovery pressure, which may be calculated according to methods known in the art. In general, the recovery pressure is approximately equal to the pressure in the upstream section 100.

Subsequent to their separation, the particles are collected from the inert gas on a filter 501. The removal of the carrying gas from the particles by the supersonic virtual impact collector drastically reduces the filter area required compared to separating the carrying gas from the particles directly.

If the material of construction of the nozzle 200 and impactor plate 401 are refractory and able to withstand high temperatures without distortion or reaction with the carrying gas, then the supersonic virtual impactor 400 can separate particles from very high temperature gases. Such high temperature gases might be generated as a part of a chemical synthesis, a combustion process, or as the result of an electric discharge. The particles to be separated may be either the desired product or an undesirable byproduct which must be removed before the gas cools, for example, when the carrying gas is condensible. It is a major advantage of the method and apparatus of this invention that very high temperature condensible carrying gases may be separated from fine particles without condensation of the carrying gas onto the particles and without the use of large are high temperature filters.

The following examples are illustrative of the conditions for the method of the invention and it is understood that the scope of the invention is not limited by them.

EXAMPLE 1

In the apparatus of FIG. 2 a carrying gas, air, at a pressure of about 500 kPa (5 atmospheres) within which are the 1 μm diameter particles it is desired to separate and collect is brought through a conduit 101 to the upstream section 100. The carrying gas and particles exit through a steel de Laval nozzle 200 with throat diameter of 0.1 cm into the downstream section 300 open to the air through a conduit 301 where the pressure is about 100 kPa (1 atmosphere) forming a supersonic stream 10 of velocity 380 m/s and diameter 0.22 cm. At a distance of 10 cm from the nozzle exit 204, a circular 2 cm diameter impactor plate 401 is placed perpendicular to the stream formed by the nozzle. In the center of the plate is a conical circular aperture 402 0.3 cm in diameter. The center of the impactor plate 401 is exactly aligned axially with the center of the nozzle 200. The aperture 402 forms the entrance of a cylindrical porous steel tube 405 forming the impactor chamber 408 into which air slowly bleeds from the impactor plenum 403 through the porous tube 405 in order to exert a pressure within the impactor chamber 408 slightly greater than that exerted by the impacting supersonic stream 10, 500 kPa, and so there is a small flow of air out of the aperture 402, opposing the supersonic stream flow. At the opposite end of the porous tube, a filter chamber 500 containing a filter 501 on which the particles are collected is disposed in communication with the impactor chamber 408. A small suction is applied via a tube 502 to the chamber 500 through the filter 501 so that some of the air which enters the porous tube 405 is drawn through the filter 501 (and some of it exits the aperture 402).

A shock wave 12 having a shape similar to that of the impactor plate is formed in the supersonic stream 20 about 0.05 cm above the surface of the impactor plate 401. The air in the supersonic stream 20 is turned aside at the impactor plate 401 flows into the downstream section 300 where it exits to ambient via a conduit 301 while the particles continue in their original direction at a velocity of 380 m/s, penetrating into the impactor chamber 408 where they are slowed by the air flow therein. At a distance of 1.3 cm from the shock wave 12, the particles have slowed to their gravitational settling velocity and the air flow in the impactor chamber 408 has been adjusted so that the direction of flow is toward the chamber 500 containing the filter 501. The particles are entrained in the flow and are conveyed thence to be collected on the filter 501.

EXAMPLE 2

It is desired to collect valuable 3 μm diameter, pure boron powders from a process stream carrying gas comprising sodium chloride vapor in which the particles are suspended without contaminating the particles by condensing sodium chloride o them using the apparatus of FIG. 2. The carrying gas with suspended fine particles is brought via conduit 101 to the upstream section 100 connected to a graphite nozzle 200 at a temperature of 1900K and a pressure of 25 kPa. The entrance section of the nozzle 201 tapers in at a half angle, A1, of approximately 20° to the throat which has a diameter of 0.6 cm. The downstream section of the nozzle 203 of the nozzle 200 is smoothly faired away from the throat 202 to a diameter of 1.3 cm at the nozzle exit 204 in a length of 10 cm. The pressure in the downstream section 300 is maintained at 1.0 kPa by using an external vacuum pump connected to conduit 301. The passage of the gas and particles through the nozzle 200 results in a supersonic stream 10 of sodium chloride vapor 1.3 cm in diameter, with a core 11 of diameter 0.6 cm where the particles are concentrated. The gas and particles in the stream achieve velocities of 1100 m/s and 800 m/s, respectively. At a distance of 2.0 cm from the nozzle exit, a circular, 4.0 cm diameter conical impactor plate 401 with included angle, $A_2$, of 160° is placed perpendicular to the stream. The plate forms the front face of the impactor chamber 408 and comprises a circular aperture 402 0.8 cm in diameter at its center. The aperture 402 forms the entrance of a cylindrical porous ceramic tube 405 0.8 cm id × 1.2 cm od × 10 cm long into which argon slowly bleeds from the impactor plenum 403 in order to exert a pressure within the impactor chamber 408 slightly greater than that exerted by the impacting supersonic stream, 25 kPa. The temperature of the argon and of the impactor chamber are maintained at 1400K to prevent sodium chloride condensation in the region where the argon and sodium chloride in the supersonic stream contact.

The supersonic stream striking the virtual impactor causes the formation of a shock wave 12 which stands about 0.65 cm away from the plate 401 At the shock wave, the gas velocity changes to less than Mach no. = 1 and the gas turns aside while the particles continue to move in their original direction at 800 m/s. As the sodium chloride flows away from the impactor plate, it encounters the walls of the downstream section 300 where it condenses separated from the particles. The temperature of the walls of the downstream section 300 may be regulated so that the condensation of the salt vapor forms liquid which can be channeled to a central collection vessel.

Approximately 6.0 cm from the shock wave 12 and 5.4 cm downstream from the aperture 402, the particles are slowed by drag forces to their gravitational settling velocity. At this location, the flow of argon is moving in a direction away from the aperture and the particles are entrained in the flow inside the impactor chamber 408. The entrained particles are transported to the end of the porous tube 405 and thence to a chamber 500 containing a heated ceramic filter 501 where they are separated physically from the argon. The ceramic filter is used to withstand the temperature of the argon (1400K); the temperature is maintained as insurance that any salt vapor which diffuses into the impactor chamber remains as a vapor and does not condense on the particles and contaminate them.

Less than 1% of the salt vapor in the supersonic stream enters the impactor chamber 408 and this is separated from the particles by the hot filter 501.

While the invention has been described with reference to a preferred embodiment, it will be appreciated by those of ordinary skill in the art that changes may be made to the method and apparatus without departing from the spirit and scope of the invention as a whole.

I claim:

1. A method for separating particles from a gas containing said particles, comprising the steps of:
   accelerating said gas containing said particles to a supersonic flow velocity in a supersonic nozzle;
   forming a shock wave in front of a virtual impactor by impacting said supersonic flow against said virtual impactor wherein said virtual impactor comprises a plate having an aperture therein and an interior chamber;
   separating said particles from said gas behind said shock wave with said virtual impactor wherein said particles substantially follow the original direction of flow of the accelerated gas said particles passing through said aperture of said impactor and the gas separated from said particles is caused to change direction from its original direction of flow and wherein the pressure in said interior is at least as great as the pressure between said shock wave and said plate so that there is a small positive outward flow of gas from said interior chamber through said aperture;
   collecting said particles in an interior chamber cavity downstream of said aperture; and
   recovering the gas separated from said particles.

2. The method of claim 1 wherein said plate is flat.

3. The method of claim 1 wherein said plate is convex.

4. The method of claim 1 wherein said plate is concave.

5. The method of claim 1 wherein said gas containing said particles is accelerated to said supersonic flow velocity in a supersonic nozzle wherein the cross-sectional shape and area of said aperture are approximately the cross-sectional shape and area of the throat of said nozzle.

6. The method of claim 1 wherein said particles are in the range of 0.1 to 10 micrometers in diameter.

7. The method of claim 6 wherein said supersonic flow velocity has a speed in the range of Mach 1 to Mach 10.

8. An apparatus for separating particles from a gas containing said particles said apparatus comprising:
   a housing having an inlet and outlet, said inlet receiving said gas containing said particles;
   supersonic nozzle means for accelerating gas containing said particles to a supersonic velocity and passing it into said inlet;
   a virtual impactor means including a plate having an aperture therein said housing and an interior chamber housing, said interior chamber housing is positioned adjacent said plate so that said aperture is positioned above said interior chamber housing, wherein said supersonic flow strikes said virtual impactor means wherein said nozzle and said impactor cause the forming of a shock wave in front of said virtual impactor means and wherein said particles flow through said aperture of said impactor into said interior chamber and the gas separated from said particles is caused to change direction from the original direction of flow;
   means for introducing an inert gas into said interior chamber thereby maintaining the pressure in said interior chamber at least as great as the pressure behind said shock wave causing a small net flow of gas from said interior chamber through said aperture;
   particle collecting means for collecting said particles in said interior chamber; and
   recovery means for recovering the gas separated from said particles wherein the gas separated from said particles exits said housing through said outlet.

9. The apparatus of claim 8 wherein said plate is flat.

10. The apparatus of claim 8 wherein said plate is convex.

11. The apparatus of claim 8 wherein said plate is concave.

12. The apparatus of claim 8 wherein a porous tube connects said aperture and said interior chamber and said inert gas is introduced through the walls of said porous tube and said porous tube provides a path for introducing said particles from said aperture into said interior chamber.

13. The apparatus of claim 8 wherein the cross sectional shape and area of said aperture is approximately the cross sectional shape and area of said nozzle.

14. The apparatus of claim 8 further comprising:
    filter means within said interior chamber for collecting said particles.

15. The apparatus of claim 14 further comprising heater means wherein said filter means is heated by said heater means to prevent condensation of condensible gases on said collected particles.

* * * * *